(12) United States Patent
Ogawa et al.

(10) Patent No.: US 7,621,362 B2
(45) Date of Patent: Nov. 24, 2009

(54) LONGITUDINALLY SLIDABLE SEAT STRUCTURE FOR TWO- OR THREE-WHEELED VEHICLE

(75) Inventors: Masao Ogawa, Saitama (JP); Shunichi Nakabayashi, Saitama (JP); Koji Shiraishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 611 days.

(21) Appl. No.: 11/080,450

(22) Filed: Mar. 16, 2005

(65) Prior Publication Data
US 2005/0206204 A1 Sep. 22, 2005

(30) Foreign Application Priority Data
Mar. 17, 2004 (JP) ............................. 2004-077066
Mar. 17, 2004 (JP) ............................. 2004-077079

(51) Int. Cl.
*B62J 1/00* (2006.01)
*B62K 11/00* (2006.01)

(52) U.S. Cl. ............. 180/219; 297/195.13; 297/215.14; 297/215.15

(58) Field of Classification Search ................. 180/219; 297/195.13, 215.12, 215.13, 215.14, 215.15
See application file for complete search history.

(56) References Cited

U.S. PATENT DOCUMENTS

| | | | |
|---|---|---|---|
| 3,822,917 A * | 7/1974 | George | 297/215.12 |
| 4,506,754 A | 3/1985 | Hirano et al. | |
| 4,776,632 A * | 10/1988 | Akimori et al. | 297/284.9 |
| 4,913,494 A * | 4/1990 | Ikegaya | 297/367 |
| 5,007,675 A | 4/1991 | Musto et al. | |
| 5,560,445 A * | 10/1996 | Saito et al. | 180/219 |
| 5,628,215 A * | 5/1997 | Brown | 70/261 |
| 5,997,088 A | 12/1999 | Stark et al. | |
| 6,152,533 A * | 11/2000 | Smuk | 297/341 |
| 6,224,081 B1 | 5/2001 | Waymann et al. | |
| 6,237,710 B1 * | 5/2001 | Mori et al. | 180/219 |
| 6,623,071 B2 * | 9/2003 | Kawamoto et al. | 297/195.13 |
| 7,290,632 B2 * | 11/2007 | Hanagan | 180/219 |
| 2005/0200173 A1 * | 9/2005 | Ono et al. | 297/217.7 |

FOREIGN PATENT DOCUMENTS

| | | |
|---|---|---|
| EP | 1 205 379 A1 | 5/2002 |
| JP | 57-10948 Y2 | 3/1982 |
| JP | 04-085185 A | 3/1992 |
| JP | 2002-145143 A | 5/2002 |

* cited by examiner

*Primary Examiner*—Lesley D Morris
*Assistant Examiner*—Marc A Scharich
(74) *Attorney, Agent, or Firm*—Birch, Stewart, Kolasch & Birch, LLP

(57) ABSTRACT

Sliding of a seat or reclining of a seat back can be disabled, except when a rider intends to slide the seat or recline the seat back. The motion of an auxiliary bar which permits sliding of a seat is inhibited by an interlocking lock member. An operating piece cannot be raised and hence it is impossible to slide the seat. An engine key is inserted into a first lock mechanism and is turned, causing the interlocking lock member to slide up to a position permitting operation of the operating piece. In addition, a lever of a second lock mechanism faces a reclining lever, so that the reclining lever cannot turn clockwise around a rivet bolt and a pawl remains engaged with any of first to third recesses. If the lever of the second lock mechanism is turned, the reclining lever can be pulled to release the reclining locked condition.

17 Claims, 16 Drawing Sheets

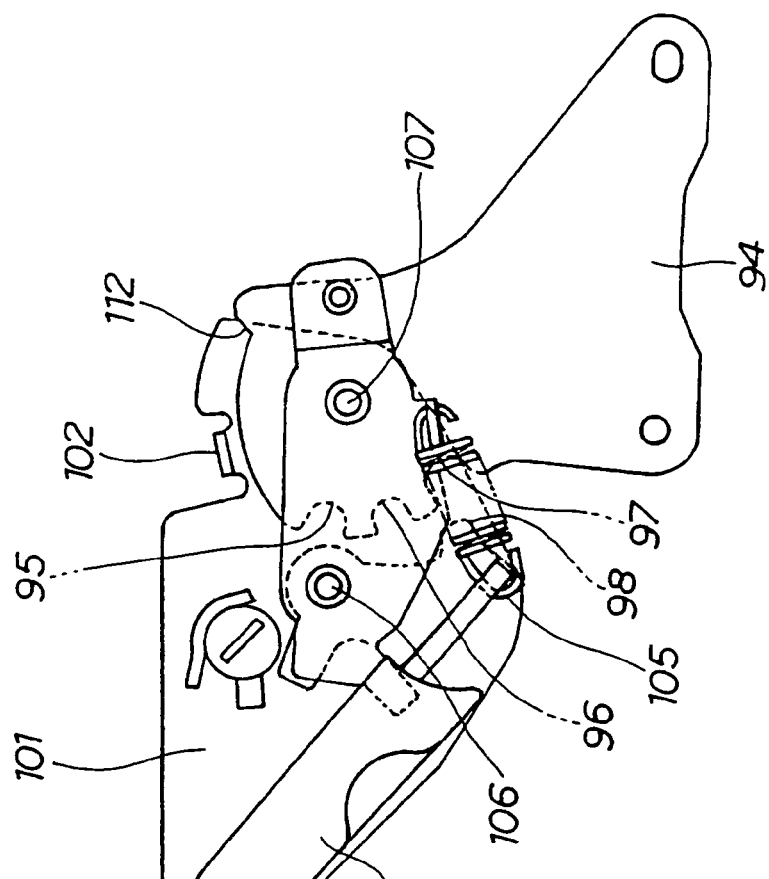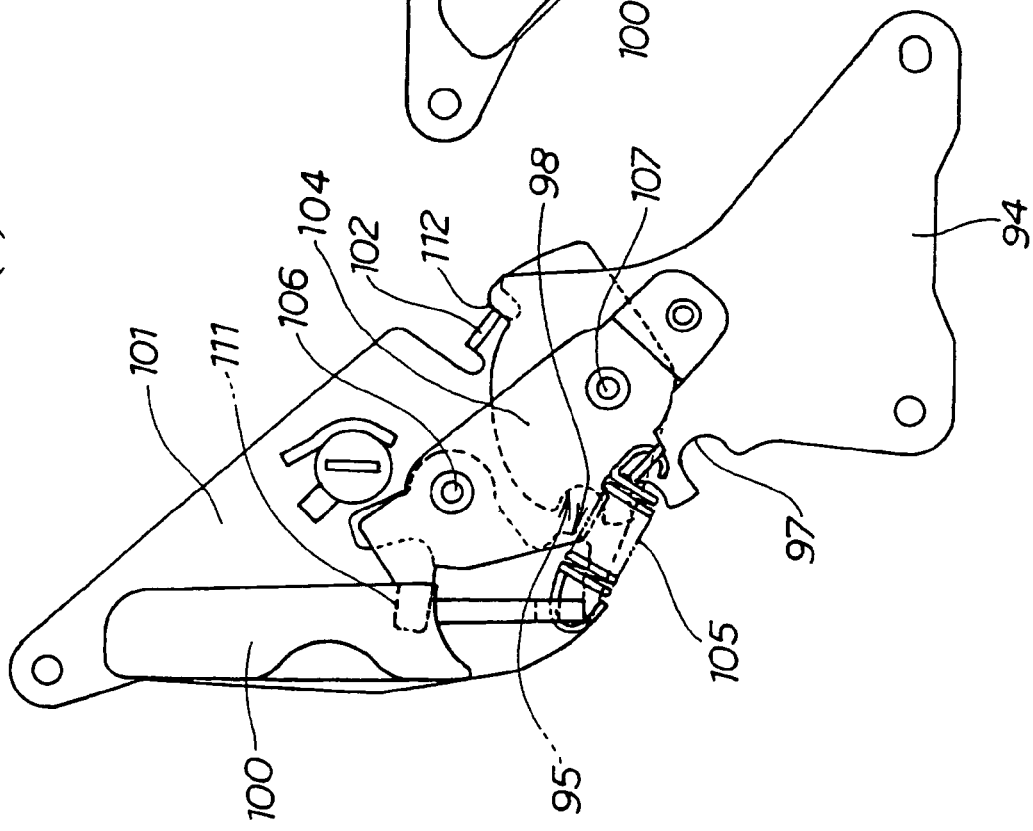

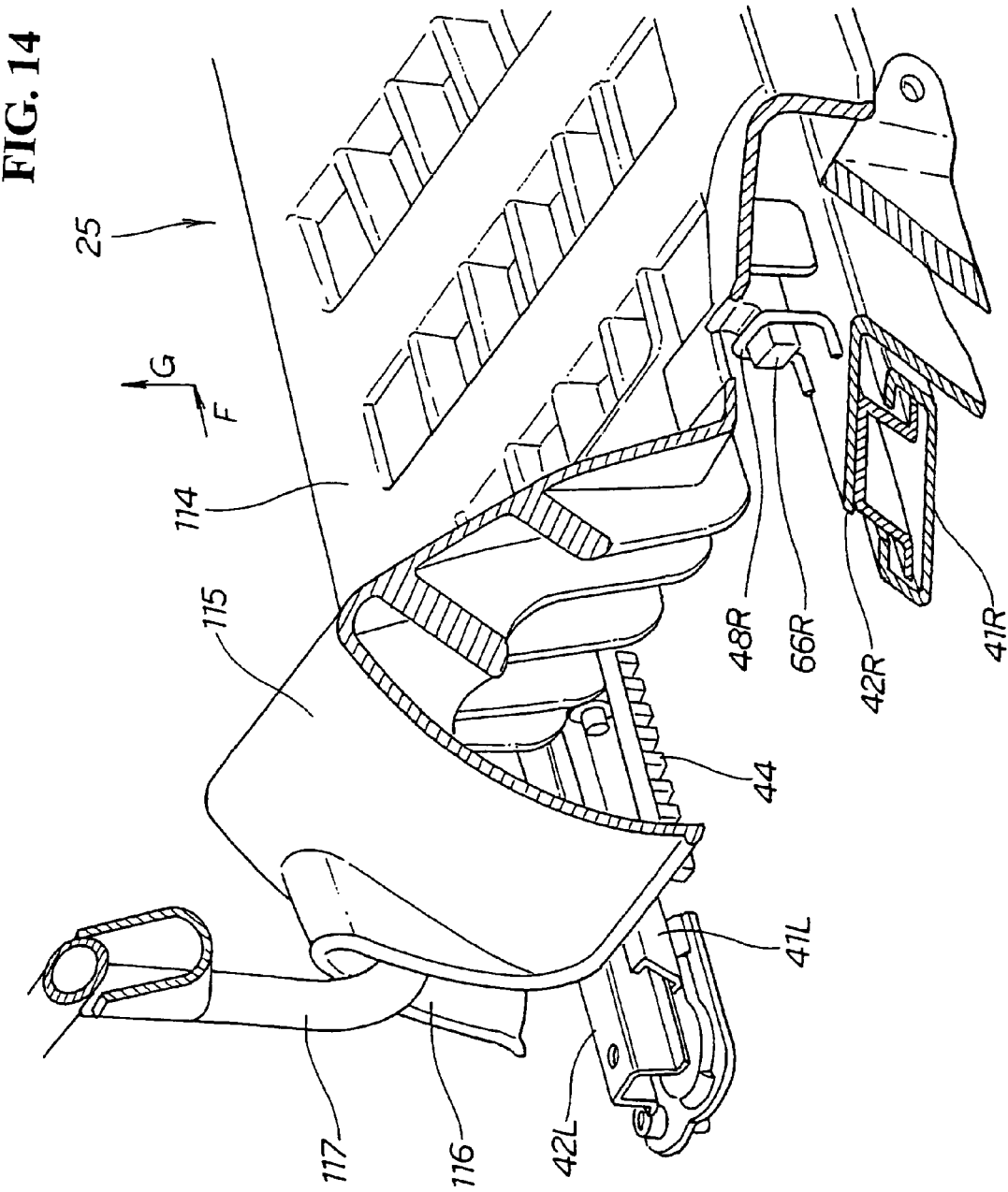

COMPARATIVE EXAMPLE

THIS EMBODIMENT

LONGITUDINALLY SLIDABLE SEAT STRUCTURE FOR TWO- OR THREE-WHEELED VEHICLE

CROSS-REFERENCE TO RELATED APPLICATIONS

This nonprovisional application claims priority under 35 U.S.C. § 119(a) on Patent Application Nos. 2004-077066 and 2004-077079, filed in Japan on Mar. 17, 2004. The entirety of each of these documents are incorporated herein by reference.

BACKGROUND OF THE INVENTION

1. Field of the Invention

The present invention relates to an improvement of a longitudinally slidable seat structure and a reclinable seat structure installed in a two- or three-wheeled vehicle.

2. Description of Background Art

A two-wheeled motor vehicle which has a tandem seat permitting the seat position to be changed is known from Japanese Patent Laid-Open No. 2002-145143 (FIG. 4). In FIG. 4 of Japanese Patent Laid-Open No. 2002-145143, the reference numeral 26 denotes a rail member, numeral 27 denotes a slide member, numeral 29 denotes an engaging member, and numeral 29a denotes an operating portion. The slide member 27, which is slidably attached to the rail member 26, can be disabled from movement by the engaging member 29 and be made movable by the operating portion 29a.

In the case of a two-wheeled motor vehicle, unlike a four-wheeled vehicle, there sometimes occurs a case where a part of the body of a rider comes into contact with the operating portion 29a unconsciously when the rider gets on or off the vehicle or when the rider moves while pushing the vehicle or passes beside the vehicle, with consequent change of the seat position. Therefore, even in the case of a slidable seat, it is desired for the seat to be capable of being kept unslidable except when the rider intends to slide the seat.

A two-wheeled motor vehicle having a reclinable seat is also known from Japanese Utility Model Publication No. Sho 57-10948 (FIG. 3). In FIG. 3 of Japanese Utility Model Publication No. Sho 57-10948, the reference numeral 2 denotes a seat portion, numeral 7 denotes a reclining device, numeral 15 denotes a back rest, and numeral 16 denotes an operating handle. The angle of the back rest 15 can be adjusted by operating the operating handle 16.

In the case of a two-wheeled motor vehicle, unlike a four-wheeled vehicle, there sometimes occurs a case where a part of the body of a rider comes into contact with the operating handle 16 unconsciously when the rider gets on or off the vehicle or when the rider moves while pushing the vehicle or passes beside the vehicle, with consequent change of the angle of the back rest 15. Therefore, even in the case of a reclinable seat, it is desired for the seat to be capable of being kept unreclinable except when the rider intends to recline the seat.

SUMMARY OF THE INVENTION

It is an object of the present invention to provide a technique which can keep the seat unslidable except when the rider intends to slide the seat.

According to a first aspect of the present invention, there is provided a slidable seat structure for a two- or three-wheeled vehicle wherein a seat is attached to a body of the two- or three-wheeled vehicle through a seat slide mechanism, the seat being movable longitudinally by operation of an operating piece attached to the seat slide mechanism, wherein a slide lock mechanism adapted to disable the longitudinal movement of the seat is provided in the vehicle separately from the operating piece.

According to a second aspect of the present invention, the slide lock mechanism can perform locking and unlocking operations with a key which permits starting of an engine installed in the vehicle.

According to a third aspect of the present invention, the vehicle body is provided with a seat catcher, the seat is provided with a striker and is constructed so as to be capable of being locked to the vehicle body, and the slide lock mechanism is provided with an interlocking lock member which maintains the seat in its locked state while maintaining the slide lock mechanism in its locked state.

According to a fourth aspect of the present invention, the operating piece is disposed on the left side of the vehicle body and the key is inserted into and removed from a lock mechanism which is provided in the slide lock mechanism on the right side of the vehicle body.

According to a fifth aspect of the present invention, the interlocking lock member is constructed so as to be movable, by turning of the key, in the transverse direction of the vehicle body between a position in which it disables the operation of the operating piece attached to the seat slide mechanism and the operation of an operating member which is for removal of the seat and a position in which both operations are made possible.

According to the first aspect of the present invention, a slide lock mechanism for disabling the longitudinal movement of the seat is installed in the vehicle separately from the operating piece for operation to lock and unlock the seat slide. Since the longitudinal movement of the seat can be disabled by the slide lock mechanism, the seat can be kept unslidable except when the rider intends to slide the seat. Therefore, there is no fear of the seat sliding even if an external force is exerted on the operating piece, and it is possible to maintain a seat position intended by the rider.

According to the second aspect of the present invention, the seat slide can be locked and unlocked with the key which permits starting of the engine installed in the vehicle. After the engine is stopped and the key is pulled out from the key hole, the key can be used to unlock the seat slide. That is, the unlocking premises stop of the engine. Since the key is thus used in common for both purposes, it is possible to prevent sliding of the seat while the vehicle is running.

According to the third aspect of the present invention, both seat locking which inhibits opening of the seat from the vehicle body side and slide locking which inhibits longitudinal sliding of the seat can be done simultaneously by the interlocking lock member as a common member. Thus, since a single component is used in common to both purposes, it is possible to decrease the number of components and hence possible to reduce the manufacturing cost.

Additionally, by operation using a single key, it is possible for the rider to effect two operations one of which is opening the seat from the vehicle body side and the other of which is sliding the seat longitudinally. Consequently, operations can be unified and the operability is improved.

According to the fourth aspect of the present invention, the operating piece is disposed on the left side of the vehicle body and the key is inserted into and removed from a lock mechanism which is provided in the slide lock mechanism on the right side of the vehicle body. Since many riders feel it easier to use their right hands, smooth operations are ensured by disposing the key-related member which performs various operations on the right side of the vehicle body and by disposing the operating piece which performs a simple operation on the left side of the vehicle body.

According to the fifth aspect of the present invention, the interlocking lock member is constructed so as to be movable in the transverse direction of the vehicle body by turning of the key. Since the interlocking lock member does not project in the longitudinal direction of the vehicle body, it is easy to ensure a space in the longitudinal direction of the vehicle body.

It is also an object of the present invention to provide a technique which can keep the seat unreclinable except when the rider intends to recline the seat.

According to a sixth aspect of the present invention, there is provided a seat structure for a two- or three-wheeled vehicle wherein a seat back is attached through a reclining mechanism to a seat provided in a body of the two- or three-wheeled vehicle and the angle of the seat back can be adjusted by operating a reclining lever, wherein a lock mechanism for disabling adjustment of the angle of the seat back is provided separately from the reclining lever.

According to a seventh aspect of the present invention, the lock mechanism can perform locking and unlocking operations with a key which permits starting of an engine installed in the vehicle.

According to an eight aspect of the present invention, the lock mechanism is disposed on the right side of the vehicle body so that the key can be inserted into and removed from the lock mechanism in the transverse direction of the vehicle body.

According to a ninth aspect of the present invention, the reclining mechanism comprises a base bracket fixed to the vehicle body side and having a plurality of recesses, a swing bracket fixed to the seat back, a reclining lever having a pawl which can pop in and out of one of the recesses on the same plane as the base bracket, a connecting plate which sandwiches the base bracket and the reclining lever in between it and the swing bracket and which supports the reclining lever pivotably through a shaft while being supported together with the swing bracket pivotably through a shaft relative to the base bracket, and a spring connected between the reclining lever and the connecting plate so as to restrict the pivotal motion of the reclining lever resiliently, the reclining lever is integrally provided with a projecting portion, and the lock mechanism is supported by the swing bracket and has a lever interlocked with rotation of the key which is inserted into the lock mechanism, the lever being movable by engagement with the projecting portion to positions permitting and inhibiting the pivotal motion of the reclining lever.

According to the sixth aspect of the present invention, the lock mechanism for disabling adjustment of the angle of the seat back is provided separately from the reclining lever. Therefore, the angle of the seat back can be maintained even when an external force acts on the reclining lever or when a large external force is exerted on the seat back. That is, since the reclining mechanism can be locked by the lock mechanism, the reclining function can be fixed except when a rider intends to recline the seat.

According to the seventh aspect of the present invention, the reclining mechanism can be locked and unlocked with the key which permits starting of the engine installed in the vehicle. After the engine is stopped and the key is pulled out from the key hole, the key can be used to unlock the reclining mechanism. That is, for unlocking the reclining mechanism it is necessary to stop the engine. Since the key is thus used in common for both purposes, it is possible to prevent reclining of the seat while the vehicle is running.

According to the eighth aspect of the present invention, since the lock mechanism is disposed on the right side of the vehicle body so that the key can be inserted into and removed from the lock mechanism in the transverse direction of the vehicle body, the insertion and removal of the key into and from the lock mechanism and the operation of the lock mechanism can be done from the right side of the vehicle and thus it is possible to facilitate operation. In addition, when the rider performs the key inserting operation while riding on the vehicle, there is no fear of starting of the vehicle because the rider's right hand leaves the throttle grip.

According to the ninth aspect of the present invention, the seat back can be reclined only when the key is inserted into the lock mechanism and the lever is turned to the reclinable position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 12(a) and 12(b) are operation diagrams thereof;

FIG. 14 is a diagram showing the structure of a rear portion of the rider seat;

DETAILED DESCRIPTION OF THE PREFERRED EMBODIMENTS

Figure 1:
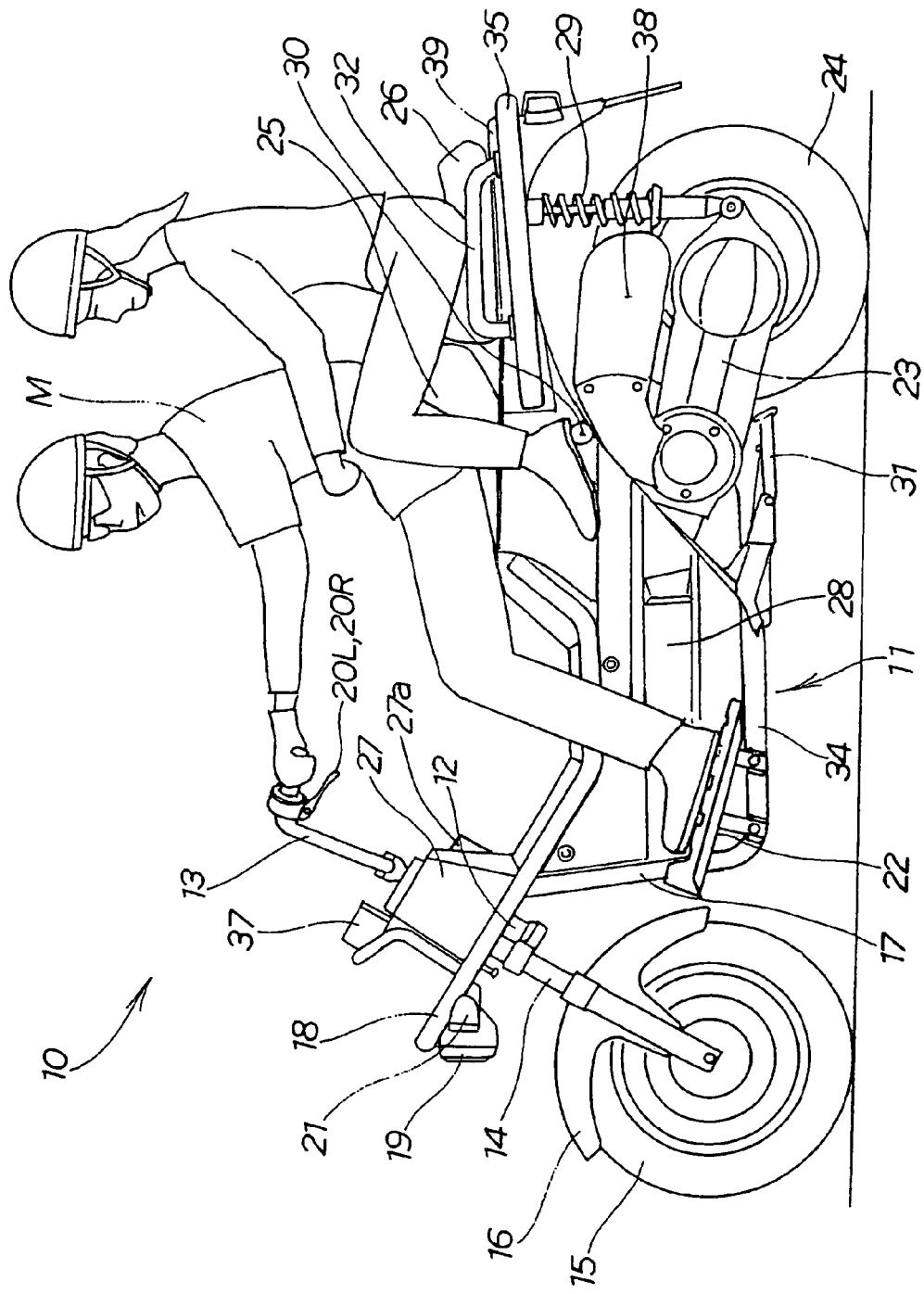
FIG. 1 is a side view of a scooter type vehicle according to the present invention.

The present invention will now be described below with reference to the accompanying drawings. The drawings should be viewed in the directions of the orientation of the reference numerals. A scooter type vehicle will be described below as an example of a two- or three-wheeled vehicle.

FIG. 1 is a side view of a scooter type vehicle according to the present invention. According to a basic structure of a scooter type vehicle 10 as a two- or three-wheeled vehicle, a steering handle 13 is mounted steerably to a head pipe 12 in a front portion of a body frame 11. A front wheel 15 and a front fender 16 are secured to a front fork 14 which is connected to the steering handle 13. Brake operating pieces 20L and 20R (L indicates the left side and R the right side with respect to a rider) are provided at left and right ends respectively of the steering handle 13.

A separate frame 18 is attached to the body frame 11. A head lamp 19 and turn signal lamps 21 are attached to the separate frame 18. Steps 22 are attached to lower pipes 34 extending from down tubes 17. A power unit 23 is secured vertically swingably to a rear portion of the body frame 11. A rear wheel 24 is secured to a rear portion of the power unit 23. A rider seat 25 is disposed obliquely upward on the front side of the rear wheel 24. A combined passenger seat and seat back 26 is disposed above the rear wheel 24. Thus, the illustrated vehicle is a light vehicle which permits both rider and passenger to ride thereon.

In the figure, the numeral 27 denotes a handle post cover, numeral 28 denotes a side cover, 29 a rear cushion, 30 a step for a passenger, 31 a stand, and 32 a grab rail.

Furthermore, the numeral 27a denotes a main switch mounting portion, which is provided on the right side (the back side in the figure) with respect to a central axis in the longitudinal direction of the vehicle body. Therefore, a main key inserting and turning operation is normally performed by the right hand.

Figure 2:
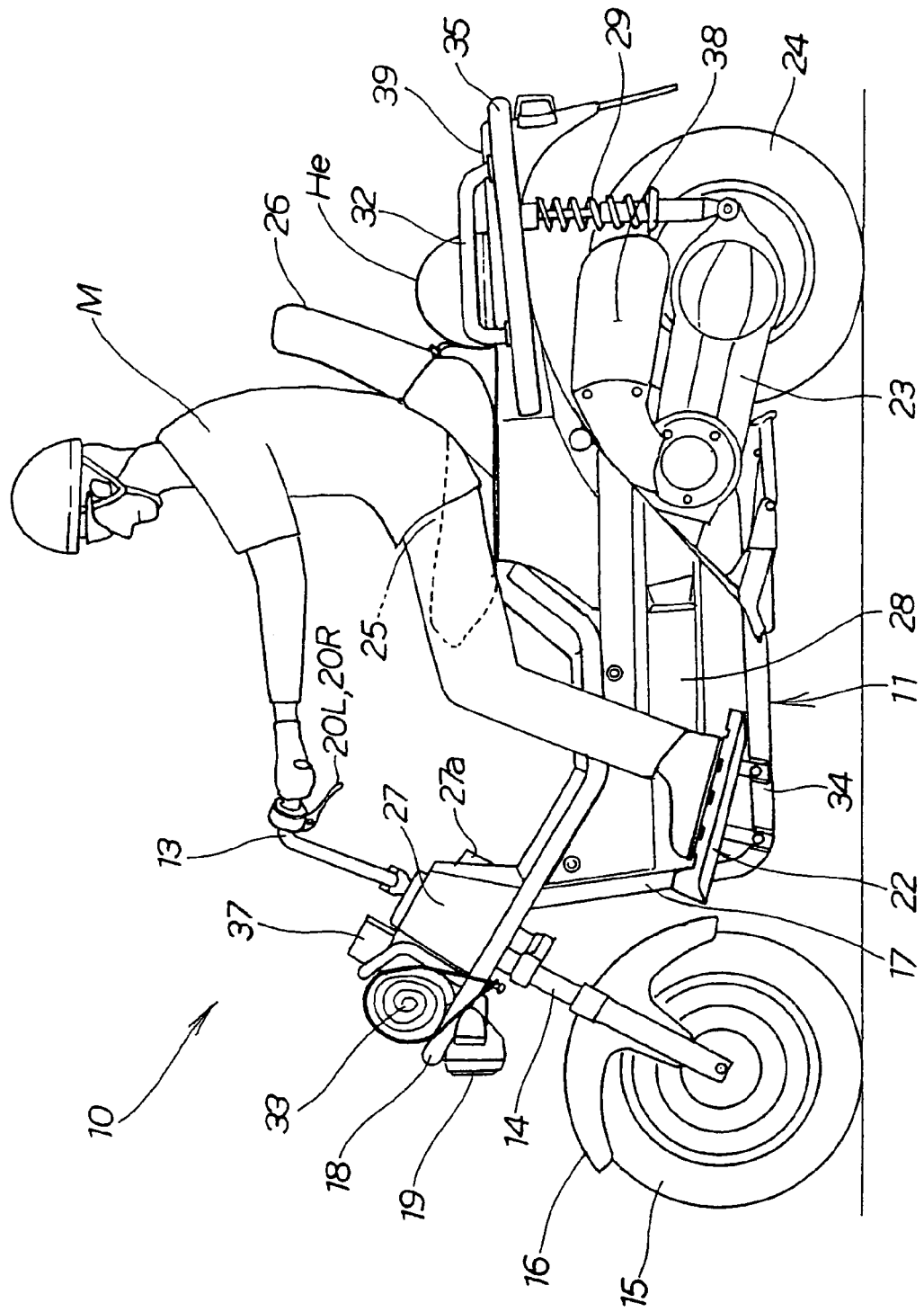
FIG. 2 is a side view of the scooter type vehicle modified into a single rider type.

FIG. 2 is a side view of a scooter type vehicle according to the present invention which has been modified into a form to accommodate a single rider. Since the basic construction thereof is the same as in FIG. 1, the same reference numerals as in FIG. 1 are used and explanations thereof will be omitted. According to this remodeled vehicle, the combined passenger and seat back 26 is erected to form a back rest, i.e., seat back, for a rider M. A piece of baggage 33 such as a tent is loaded in a front portion of the separate frame 18.

This scooter type vehicle is further characterized in that the steering handle 13 and the grab rail 32, as well as the separate frame 18, down tubes 17, lower pipes 34 extending from the down tubes 17, and rear frame 35 are exposed.

In the conventional scooter type vehicles, the body frame is covered with a body cover so that the greater part of the body frame is not exposed. In contrast therewith, in the present invention, the greater part of the body frame is exposed to exhibit an appearance characteristic not obtained so far.

In FIG. 2, He denotes a helmet, 37 a meter unit, 38 an air cleaner, and 39 a goods rest or package tray.

Figure 3:
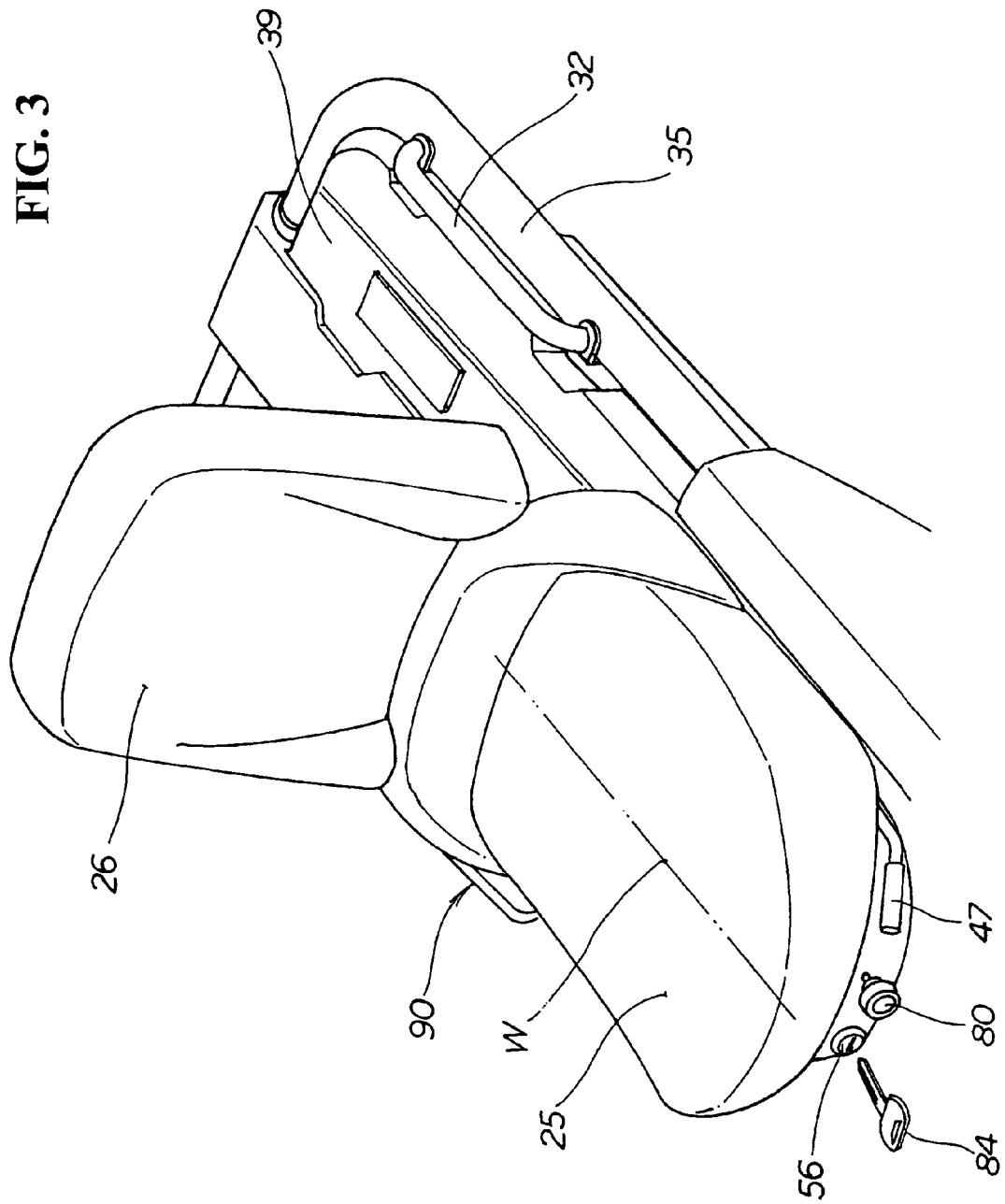
FIG. 3 is a perspective view showing a rider seat (a passenger seat raised state) according to the present invention.

FIG. 3 is a perspective view showing the rider seat (a passenger seat raised posture) according to the present invention. By raising the combined passenger seat and seat back 26, the rider seat 25 serves as a seat with back rest. A reclining mechanism 90, the details of which will be described later, is disposed on the right side with respect to a longitudinal axis W of the vehicle body. The angle of the combined passenger seat and seat back 26 can be changed, for example it can be laid down, by operation of the reclining mechanism 90.

In FIG. 3 it is shown that the goods rest 39 and the grab rail 32 are attached to the rear frame 35. The goods rest 39 is formed by an uneven plate of resin or a light metal. With an uneven plate, as compared with a flat plate, a section modulus thereof can be increased to a great extent and a larger number of goods can be loaded thereon.

Below the front edge of the rider seat 25 there are disposed, as components of a slide lock mechanism (to be described in detail later), an operating piece 47, a first lock mechanism 56, and an unlocking knob 80. The unlocking knob 80 is used when removing the rider seat 25 upward from the vehicle body.

The rider (the mark M in FIG. 2) on the rider seat 25 releases the accelerator to stop the vehicle, then turns with his or her right hand a key 84 which has been inserted into the main switch (27a in FIG. 2) to an engine stop position and pulls out the key 84 from the main switch. The rider then inserts the key thus pulled out into the first locking mechanism 56 and turns it in an unlocking direction. These series of operations, the details of which will be described later, are carried out continuously by the right hand.

Since the operating piece 47 is disposed on the left side of the vehicle body, the rider M can operate the operating piece 47 by his or her left hand. In FIG. 2, therefore, the rider M can perform a seat sliding operation with the right-hand brake operating piece 20R actuated.

Since the first locking mechanism 56 is disposed on the right side and the operating piece 47 on the left side so that the right and left hands can be utilized efficiently, it is possible to greatly improve the operability. In addition, since the seat sliding operation can be performed with the brake actuated, it is possible to effect operation in a stable state. Moreover, since the key 84 is used in common, the seat sliding operation can be performed while the engine is stopped. Furthermore, since the key 84 is used in common, it is not necessary to provide plural keys and hence possible to decrease the number of parts and improve the operability.

Figure 4:
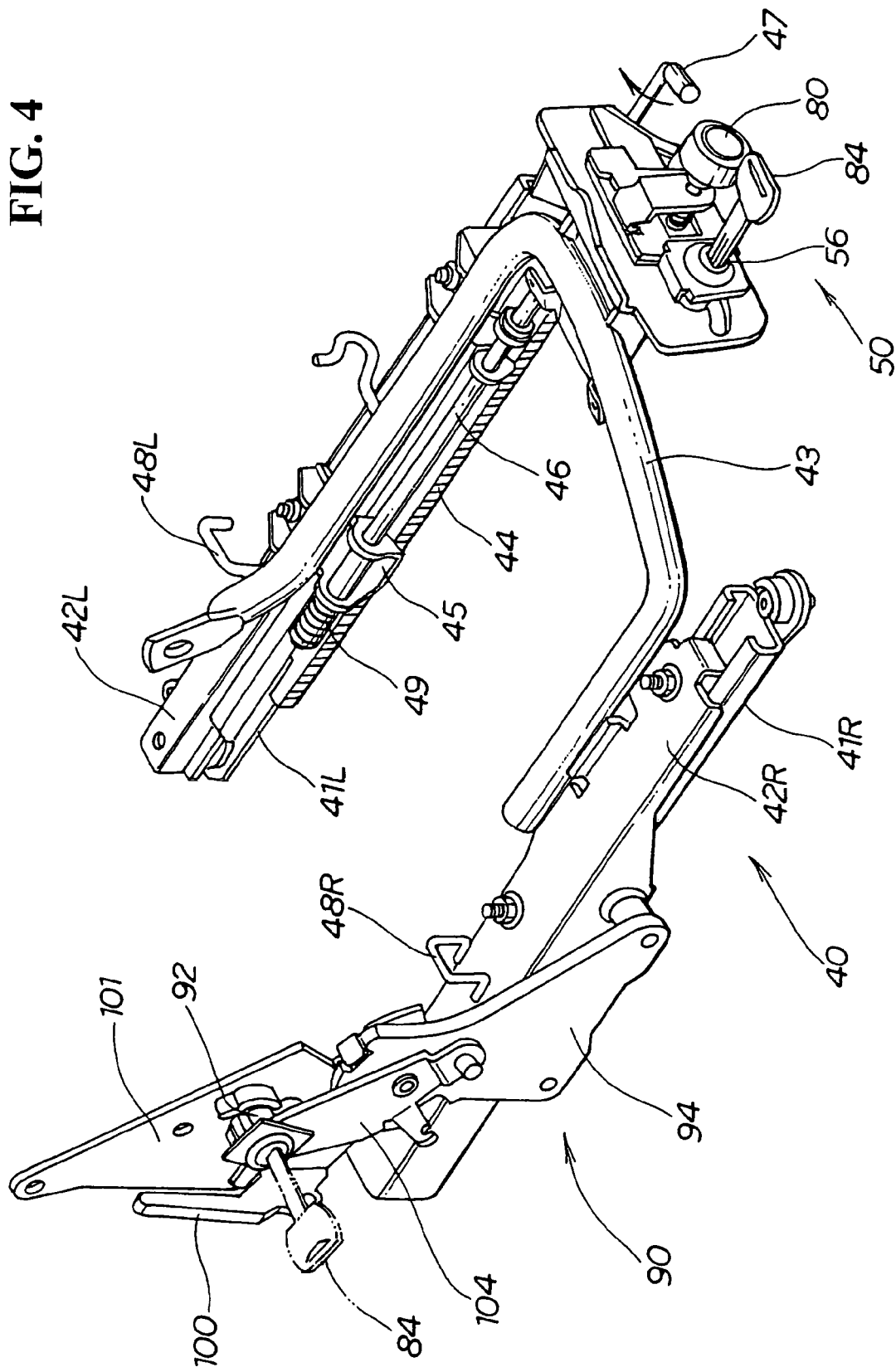
FIG. 4 is a perspective view of a seat slide mechanism according to the present invention.

FIG. 4 is a perspective view of the seat slide mechanism adopted in the present invention. The seat slide mechanism 40 includes left and right rail members 41L, 41R which are fixed to the vehicle body. Left and right sliders 42L, 42R are slidably mounted on the rail members 41L and 41R. A V- or U-shaped cross pipe 43 is entrained on the sliders 42L and 42R. A toothed member 44 is attached to the left rail member 41L. A long bar 46 extends longitudinally of the vehicle body and is provided with a pawl 45 engaged with the toothed member 44. An operating piece 47 is formed at a front end the long bar 46. A torsion spring 49 functions to return the operating piece 47.

When the operating piece 47 is raised or turned as indicated with an arrow, the pawl 45 is disengaged from the toothed member 44 and the sliders 42L and 42R become movable horizontally. When the hand grasping the operating piece 47 is released to return the operating piece 47, which returns under the action of the spring 49, the pawl 45 comes into engagement with the toothed member 44 and the sliders 42L and 42R are locked as they are and become unmovable.

With regard to a hook 48R provided on the right slider 42R, the reclining mechanism 90, a hook 48L provided on the left slider 42L, and the slide lock mechanism 50 provided at a front end of the V- or U-shaped cross pipe 43, the details thereof will be described later.

Figure 5:
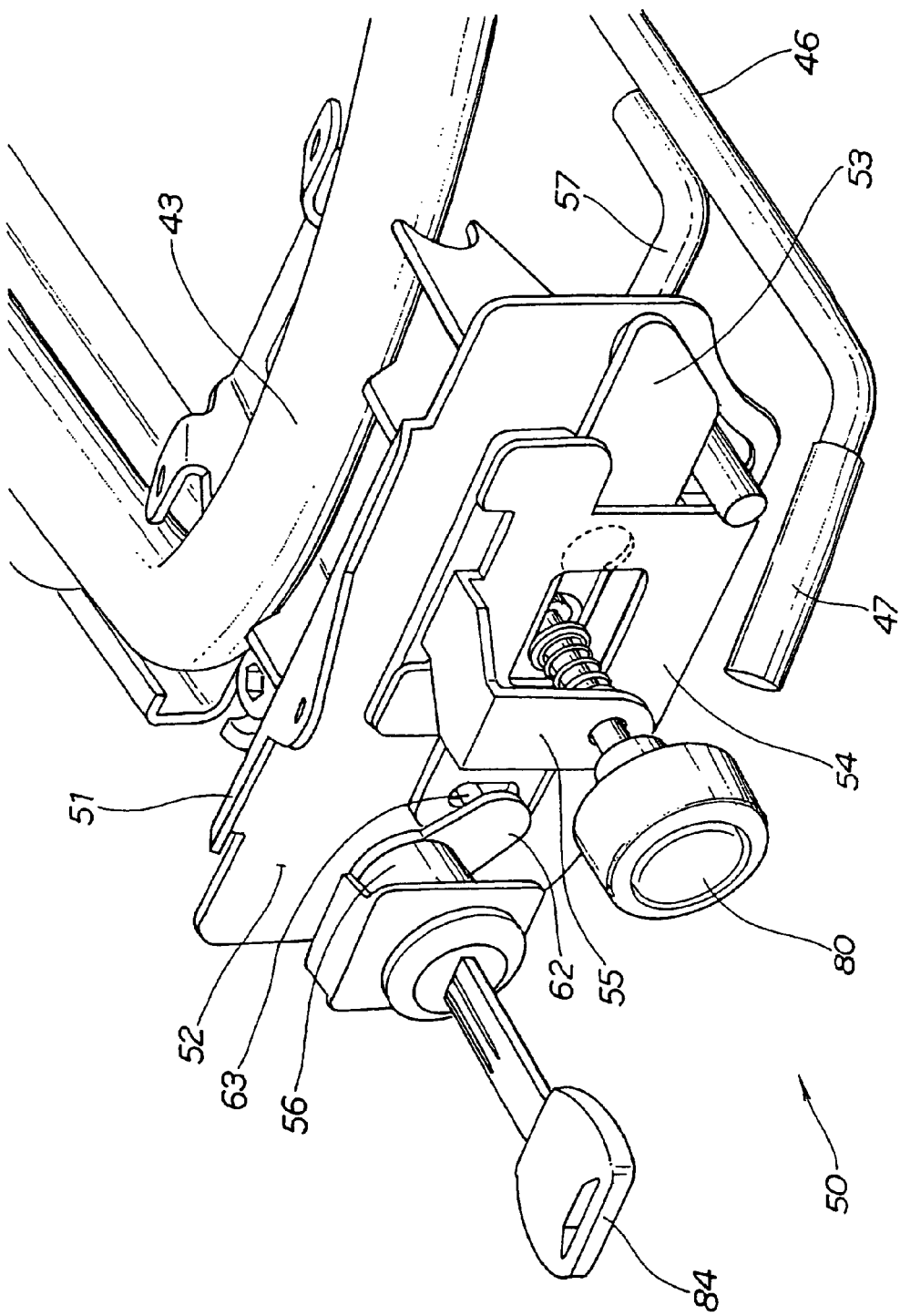
FIG. 5 is a perspective view of a slide lock mechanism according to the present invention.

FIG. 5 is a perspective view of the slide lock mechanism 50 according to the present invention. The slide lock mechanism 50 comprises a bracket 51 attached to the cross pipe 43. A laterally long interlocking lock member 53 extends along a front plate 52 of the bracket 51. A guide member 54 is attached to the front plate 52 to guide the interlocking lock member 53 for horizontal movement. A stay 55 projects from the guide member 54 to support the unlocking knob 80 as an operating member. A first lock mechanism 56 is attached to a cover (not shown) or to the front plate 52 and is oriented in the longitudinal direction of the vehicle body. An auxiliary bar 57 extends from the longitudinally long bar 46 and passes through the front plate 52.

Figure 6A:
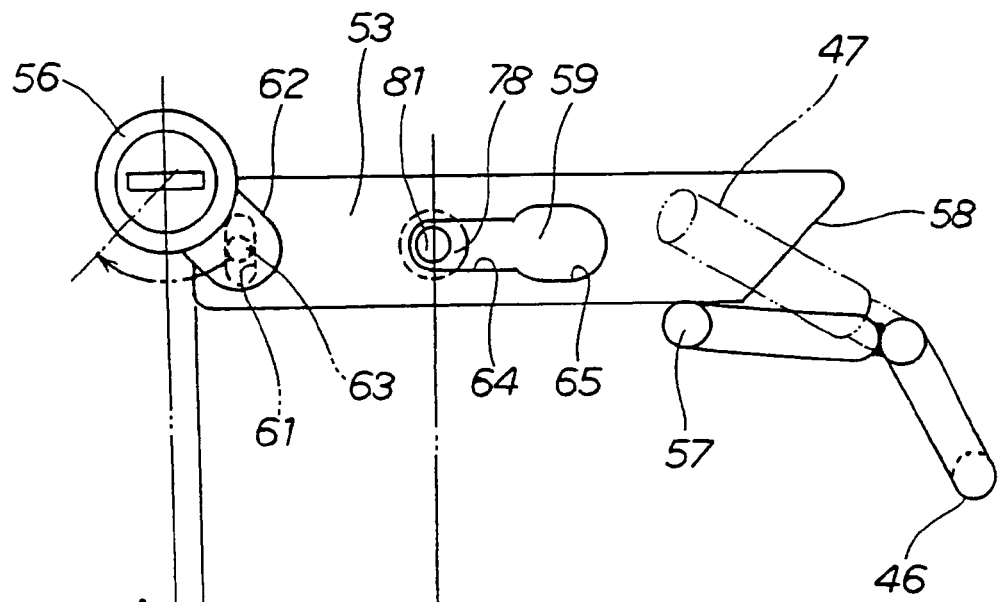
FIGS. 6(a) and 6(b) are operation diagrams thereof.
Figure 6B:
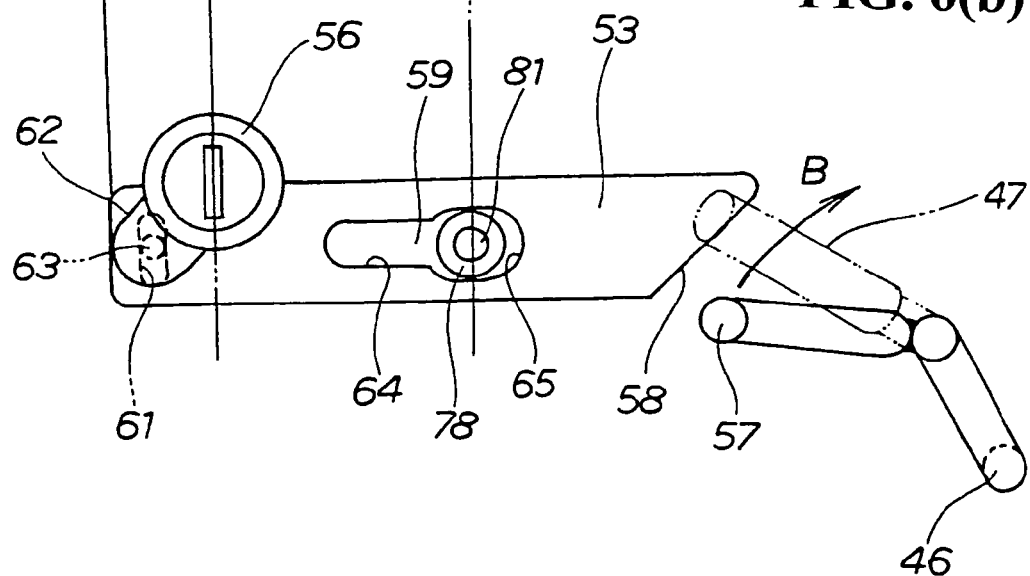

FIGS. 6(*a*) and 6(*b*) are operation diagrams of the slide lock mechanism according to the present invention. The interlocking lock member 53 is a laterally long rectangular plate and is provided at a front end (the right end in the figure) thereof with a slanted side portion 58. The interlocking lock member 53 is also centrally provided with an approximately elliptic hole 59 which is laterally long and which includes a small-diameter portion 64 and large-diameter portion 65. The interlocking lock member 53 is further provided at a base portion thereof with a longitudinally long hole 61. A pin 63 extends to the back side of the drawing from a lever 62 attached to the first lock mechanism 56 and is fitted in the long hole 61.

FIG. 6(*a*) shows a slide locked condition, in which the interlocking lock member 53 is located on the auxiliary bar 57 and therefore the operating piece 47 indicated by an imaginary line cannot be raised. If the operating piece 47 cannot be raised, then the slide locked condition continues and the seat cannot be moved back and forth. In order to release the slide locked condition, it is necessary to turn the lever 62 of the first lock mechanism 56 in the clockwise direction in the drawing.

A connecting rod 81 extends through the approximately elliptic hole 59. Although the details of the connecting rod 81 will be described later, the connecting rod 81 is positioned in the small-diameter portion 64 of the approximately elliptic hole 59. Therefore, when a large diameter collar member 78 comes into abutment against the back side of the interlocking lock member 53, the connecting rod 81 cannot be drawn out any further (out of the page in the drawing).

FIG. 6(*b*) shows a state in which the slide locked condition can be released. More specifically, the interlocking lock member 53 moves only a distance indicated by an arrow A under the action of the first lock mechanism 56. Therefore, the slanted side portion is moved away from the auxiliary bar 57. This results in the auxiliary bar 57, the operating piece 47 and the longitudinally long bar 46 becoming rotatable as indicated by an arrow B. The slanted side portion 58 of the interlocking lock member 53 is formed substantially along the rotating direction of the auxiliary bar 57.

In this state, the connecting rod 81 is positioned in the large-diameter portion 65 of the approximately elliptic hole 59. Since the large-diameter portion 65 is larger in diameter than the collar member 78, the connecting rod 81 can be drawn out further (out of the page in the drawing).

The seat slide mechanism 40 and the slide lock mechanism 50 have been described above. A description will now be given below regarding how to remove the seat from the vehicle body.

Figure 7:
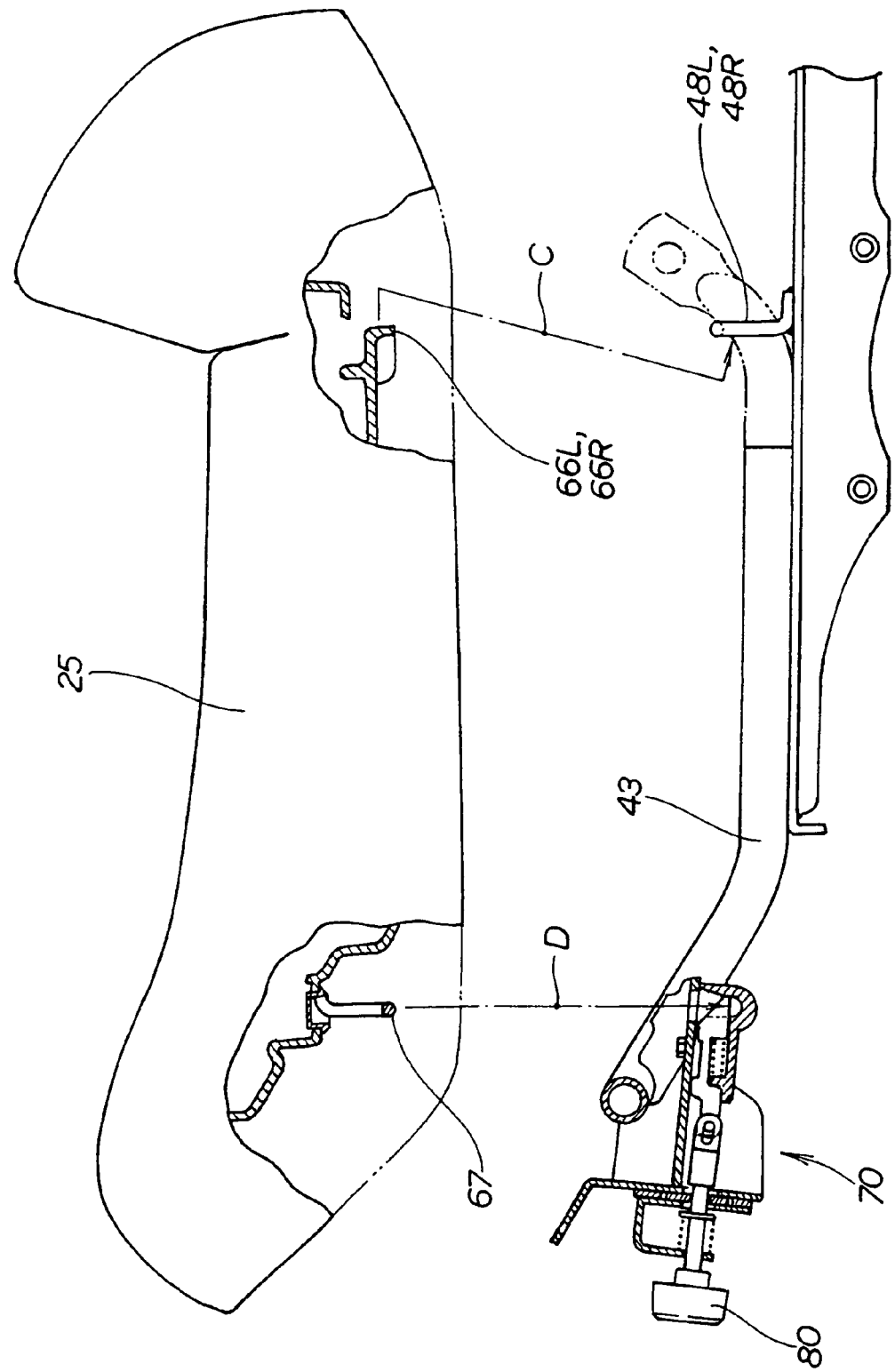
FIG. 7 is a diagram showing how to mount the seat.
Figure 8A:
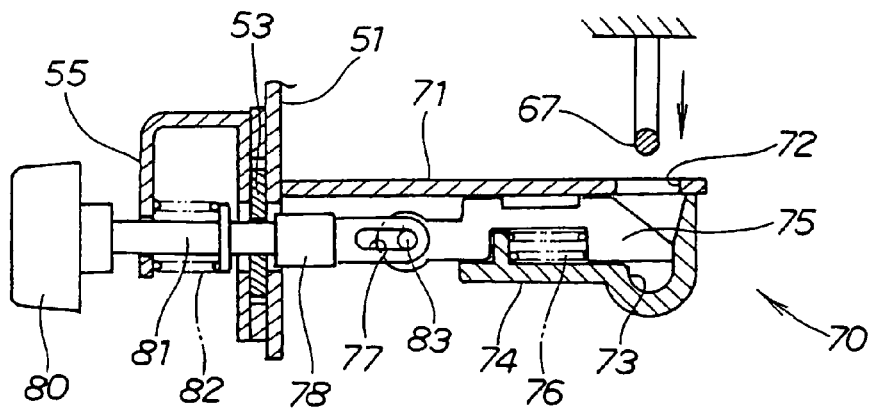
FIGS. 8(a)-8(d) are combined construction and operation diagrams of a seat catcher according to the present invention.
Figure 8B:
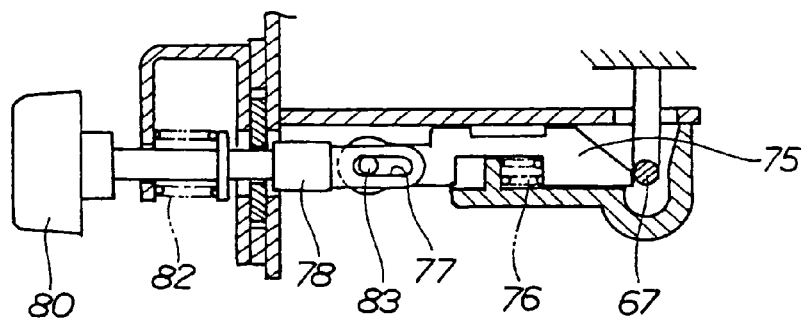
Figure 8C:
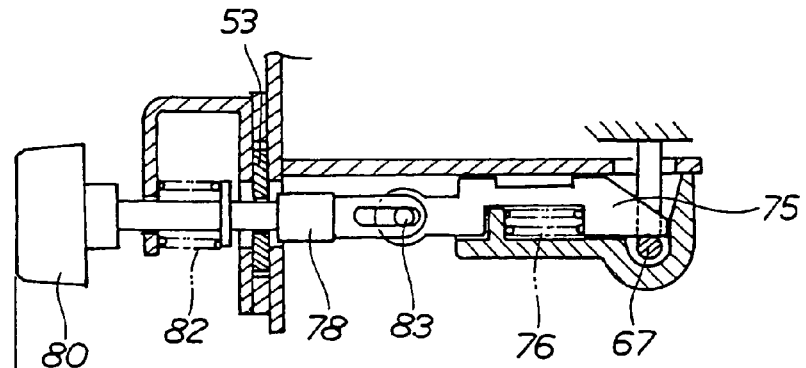
Figure 8D:
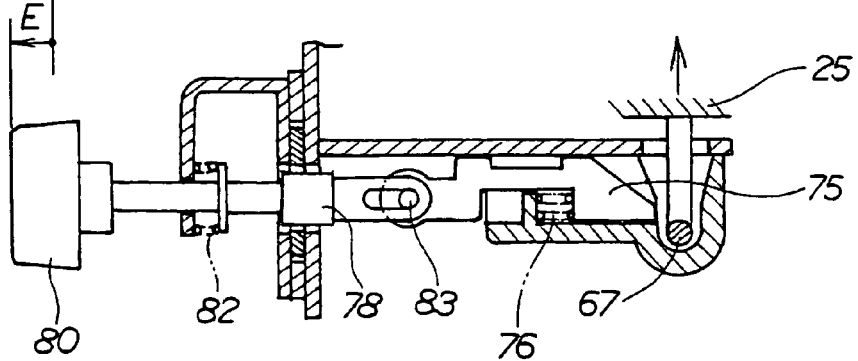

FIG. 7 shows how the seat according to the present invention is mounted. First, inserting pieces 66L and 66R provided at lower positions of a rear portion of the driver seat 25 are inserted (as shown by an arrow C) into the hooks 48L and 48R provided on the vehicle body side. A striker 67, which is provided at a lower position of a front portion of the driver seat 25, is inserted (as shown by an arrow D) into a seat catcher 70 provided on the vehicle body side. In this way the rider seat 25 can be mounted to the vehicle body.

The details of the seat catcher 70 will be described below. FIGS. 8(*a*) to 8(*d*) are combined construction and operation diagrams of the seat catcher according to the present invention.

In FIG. 8(*a*), the seat catcher 70 comprises a through hole 72 formed in a horizontal plate 71 of the bracket 51 for passing the striker 67 therethrough. A sub-bracket 74 is attached to a lower surface of the horizontal plate 71 and has a recess 73 for receiving the striker 67 therein. A wedge member 75 is supported horizontally movably by the sub-bracket 74 so that it can pop in and out of the recess 73. A first spring 76 is provided for urging the wedge member 75 rightward in the drawing. A connecting rod 81 has a long hole 77 at one end. A collar member 78 is provided at a central position of the connecting rod 81 and an unlocking knob 80 at an opposite end thereof. A second spring 82 is provided for urging the connecting rod 81 rightward in the drawing. Numeral 83 denotes a pin extended from a base portion of the wedge member 75. The pin 83 is fitted in the long hole 77 of the connecting rod 81.

In this state, even if an attempt is made to pull the unlocking knob 80 leftward in the drawing, it is impossible to pull the knob 80 because the collar member 78 comes into abutment against the interlocking lock member 53. However, the wedge member 75 can be moved leftward in the drawing because the long hole 77 is present. Therefore, the striker 67 is moved down toward the recess 73.

FIG. 8(*b*) shows a state in which the wedge member 75 has been moved leftward in the drawing by means of the striker 67 due to the presence of the long hole 77.

In FIG. 8(*c*), when the striker 67 moves down to a predetermined position, the wedge member 75 moves rightward in the drawing under the action of the first spring 76 and the rise of the striker 67 is prevented by the wedge member 75. The scooter type vehicle is normally used in this state. Even if an attempt is made to pull the unlocking knob 80, it is impossible to pull the knob 80 because the collar member 78 comes into abutment against the interlocking lock member 53. For unlocking, it is necessary to take the following procedure.

In FIG. 5, when the key (main key) 84 used to start the engine is inserted into the first lock mechanism 56 and is turned in a predetermined direction, the interlocking lock member 53 moves only a distance indicated by the arrow A as in FIG. 6(*b*), so that the large-diameter portion 65 of the approximately elliptic hole 59 is positioned on the connecting rod 81 and hence it becomes possible to pull out the connecting rod 81. Then, in FIG. 8(*d*), the unlocking knob 80 is pulled (as shown by an arrow E) to move the wedge member 75 leftward in the drawing through the connecting rod 81. As a result, it is possible to release the striker 67 and raise the rider seat 25. The key 84 can be inserted and pulled out only when the first lock mechanism 56 is in its locking condition.

The following description is now provided about the reclining mechanism 90.

Figure 9:
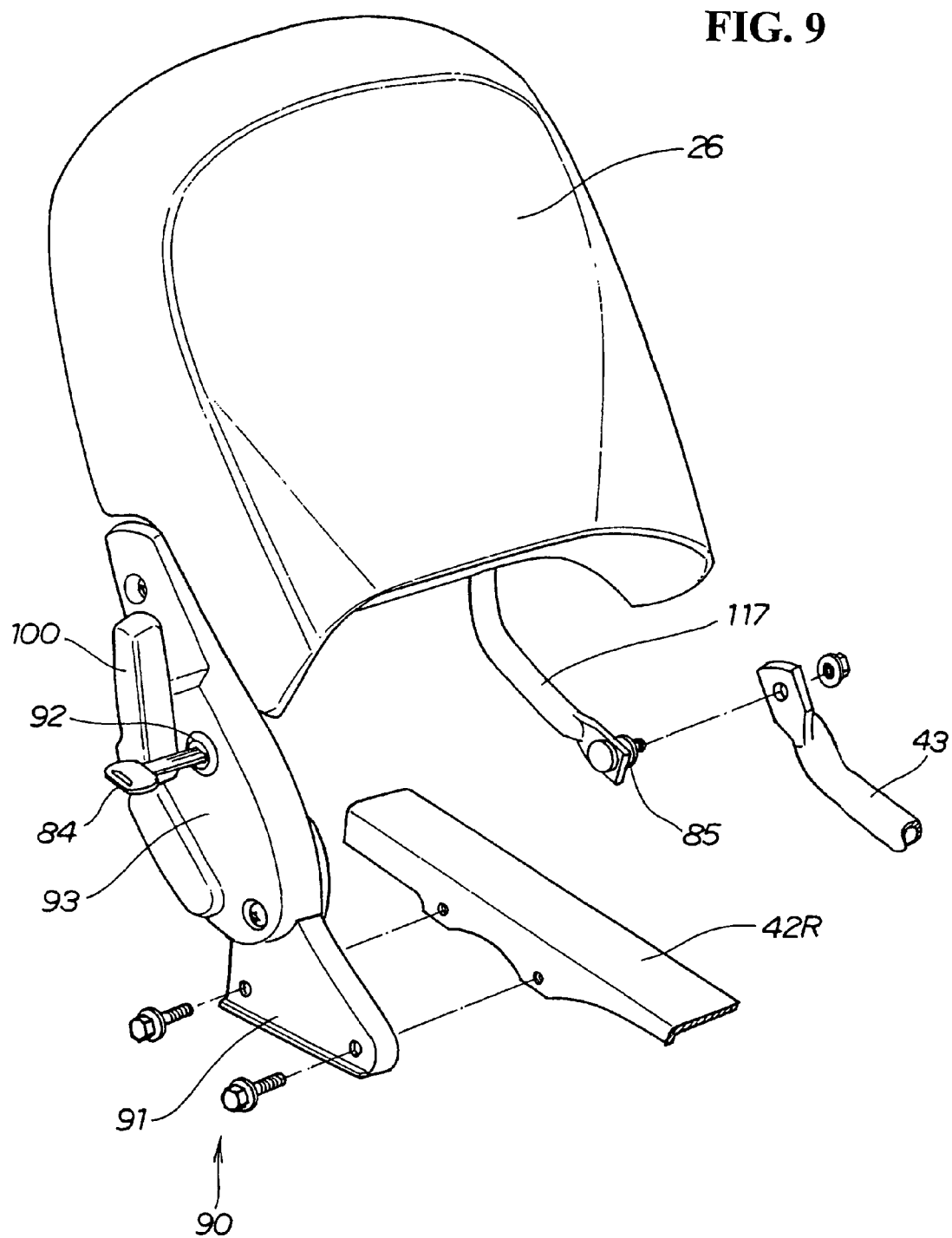
FIG. 9 is a diagram showing how to mount a combined passenger seat and seat back according to the present invention.

FIG. 9 is a diagram showing how to mount the combined passenger seat and seat back according to the present invention. The combined passenger seat and seat back 26 is mounted to the right slider 42R through the reclining mechanism 90 and is secured to a rear end of the cross pipe 43 pivotably with a pin 85. Therefore, the mounting angle of the combined passenger seat and seat back 26 can be changed.

The reclining mechanism 90 can be locked and unlocked with the key 84. For example, in FIG. 2, the rider M can perform a series of operations continuously with one hand, involving releasing the accelerator to stop the vehicle, turning the key (not shown) in the main switch mounting portion 27*a* with the right hand to stop the engine, pulling out the key, inserting the key into a lock mechanism 92 shown in FIG. 9 while holding the key with the right hand, turning the key to adjust the angle of the combined passenger seat and seat back 26, and turning the key 84 in the reverse direction to lock the reclining mechanism 90.

The reclining mechanism 90 used for the combined passenger seat and seat back 26 is a structure covered with a lower cover 91 and an upper cover 93 provided with a second lock mechanism 92. In the following description, the internal mechanism will be explained with the covers 91 and 93 removed.

Figure 10:
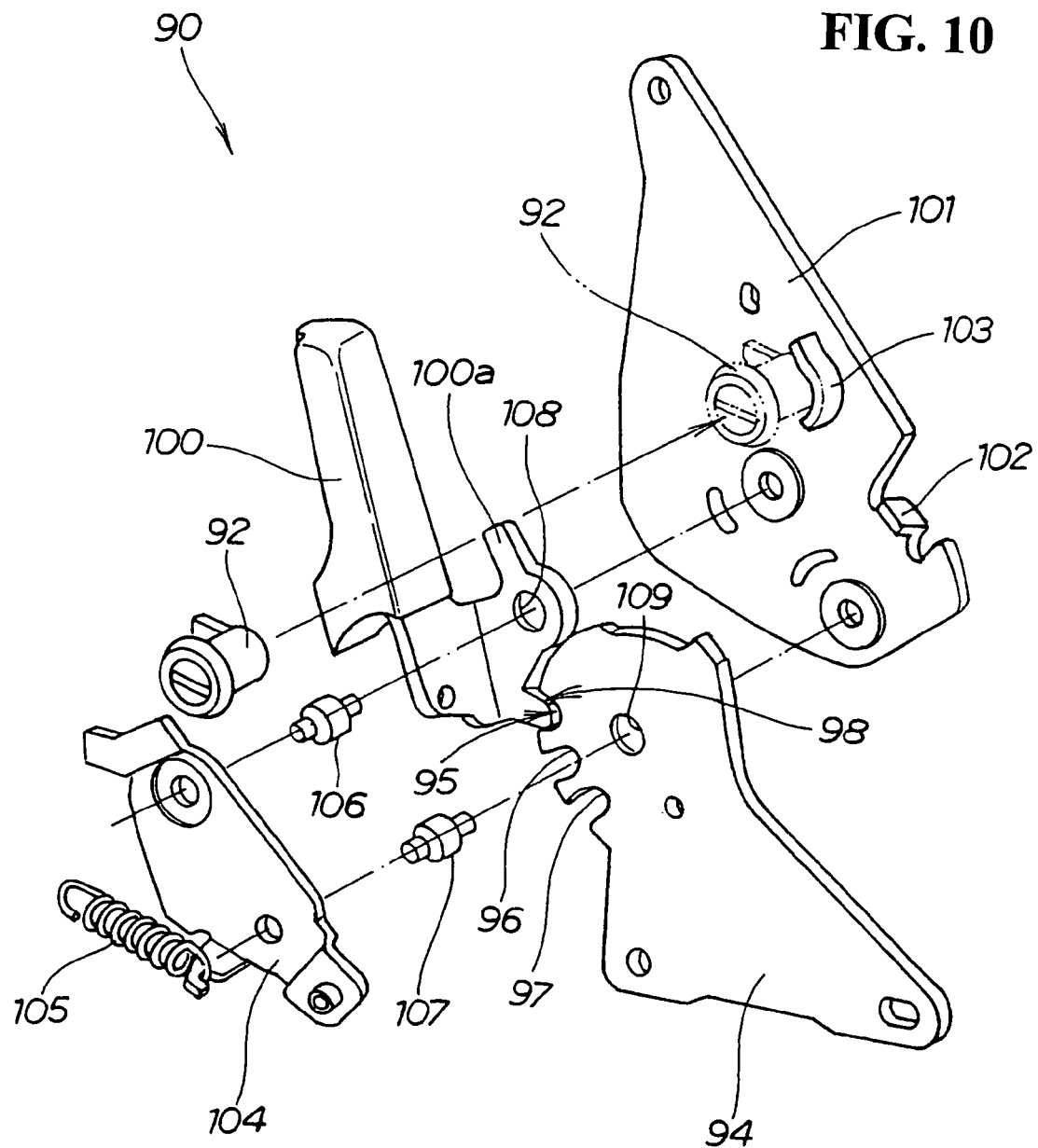
FIG. 10 is an exploded diagram of a reclining mechanism according to the present invention.

FIG. 10 is an exploded diagram of the reclining mechanism according to the present invention. The reclining mechanism 90 includes, as main components thereof, a base bracket 94 fixed to the vehicle body side, a first recess 95, a second recess 96 and a third recess 97 formed as cutout portions in an upper rear portion of the base bracket 94. A reclining lever 100 has a pawl 98 which comes into engagement with any of the first to third recesses 95 through 97. A swing bracket 101 is connected to the combined passenger seat and seat back 26 side. A stopper piece 102 is formed by bending a part of the swing bracket 101. A lug 103 projects from the swing bracket 101 to support the second locking mechanism 92. A connecting plate 104 is disposed in opposition to the swing bracket 101. A spring 105 is anchored at one end thereof to the connecting plate 104. Two rivet pins 106 and 107 are also included.

One rivet pin 106 is passed through a hole 108 formed in the reclining lever 100, while the other rivet pin 107 is passed through a hole 109 formed in the base bracket 94. The swing bracket 101 and the connecting plate 104 are brought into a sandwiching relation to the base bracket 94 and the reclining lever 100. By caulking both ends of the rivet pins 106 and 107, the swing bracket 101 and the connecting plate 104 are connected and united with the rivet pins.

Figure 11:
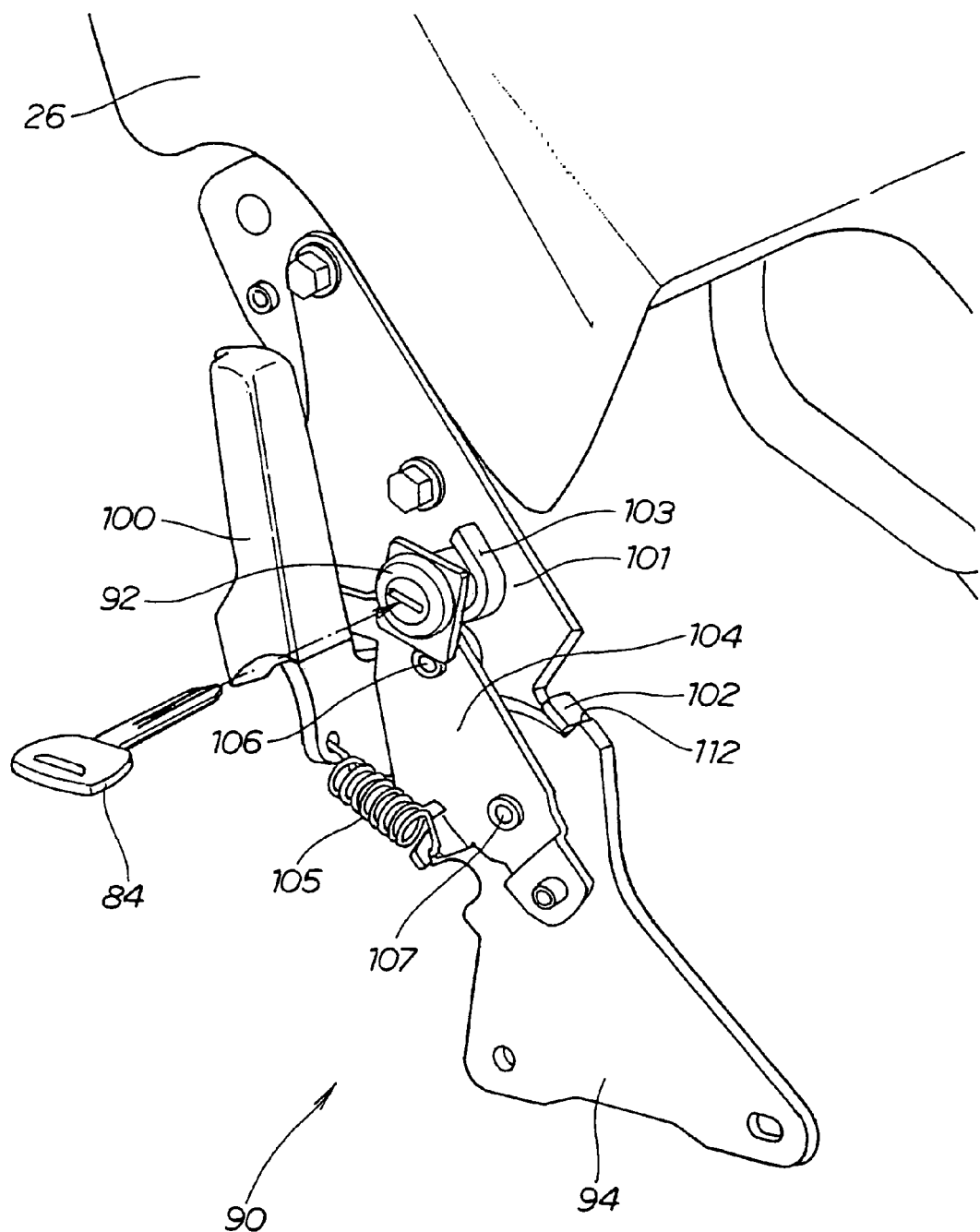
FIG. 11 is a perspective view thereof.

The thus-assembled state is as illustrated in FIG. 11. FIG. 11 is a perspective view of the reclining mechanism according to the present invention, in which the combined passenger seat and seat back 26 is connected to the swing bracket 101 and an opposite end of the spring 105 is anchored to the reclining lever 100. The second lock mechanism 56 can be operated with the key 84 which is used for starting the engine.

FIGS. 12(a) and 12(b) are operation diagrams of the reclining mechanism according to the present invention. In FIG. 12(a), when the reclining lever 100 is turned clockwise around the upper rivet pin 106, the pawl 98 engaged with the first recess 95 becomes disengaged. Once the reclining lever 100 comes into abutment against a stopper 111 formed in an upper portion of the connecting plate 104, it does not turn any more in the clockwise direction in the drawing.

In the state of FIG. 12(a), the swing bracket 101 can be turned counterclockwise around the lower rivet pin 107. The swing bracket 101 cannot turn in the clockwise direction because the stopper piece 102 comes into abutment against a stopper receiving surface 112 on the base bracket 94 side. That is, an upper limit of the combined passenger seat and seat back 26 can be defined by both the stopper piece 102 and the stopper receiving surface 112 (see also FIG. 11).

FIG. 12(b) shows a state in which the pawl 98 faces the third recess 97 as a result of the swing bracket 101 having turned counterclockwise in the drawing around the lower rivet pin 107 and the reclining lever 100 also turned counterclockwise together with the swing bracket. If the reclining lever 100 is released, the pawl 98 comes into engagement into the third recess 97 under the pulling action of the spring 105, so that a reclining locked condition results. This is also true of the second recess 96.

By operating the reclining lever 100 to release the reclining locked condition, the combined passenger seat and seat back can be set at an arbitrary angle. Although the number of locking steps for reclining is three in this embodiment, it is arbitrary.

Figure 13A:
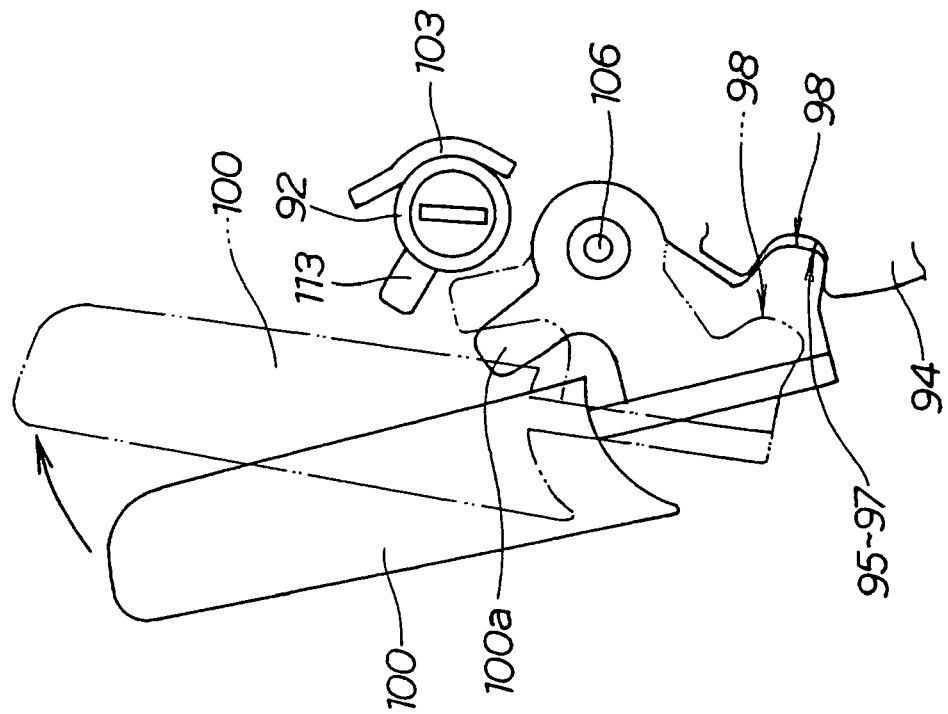
FIGS. 13(a) and 13(b) are diagrams explanatory of reclining locking and unlocking operations in the present invention.
Figure 13B:
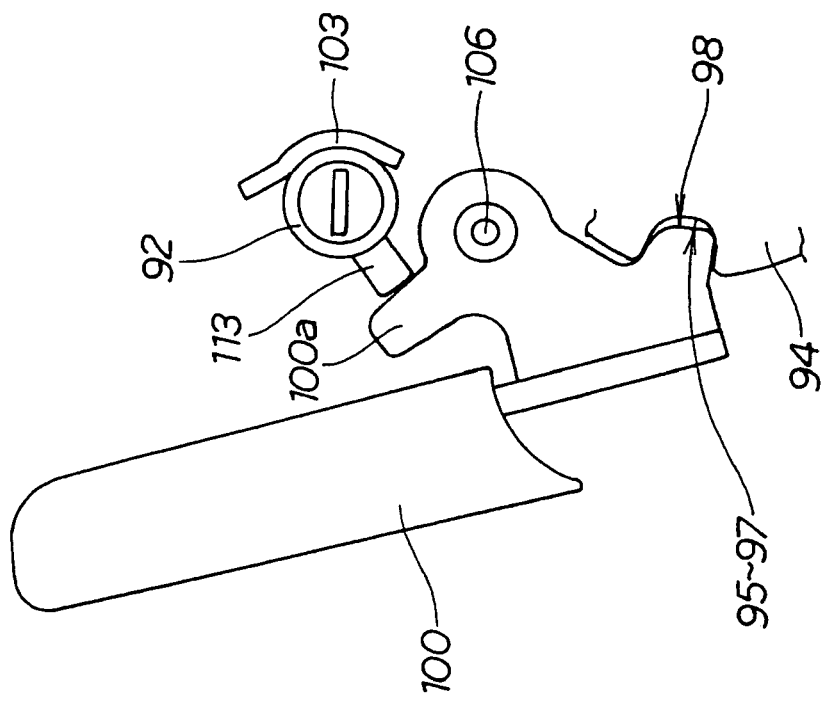

FIGS. 13(a) and 13(b) are diagrams of reclining locking and unlocking operations in the present invention. FIG. 13(a) shows a reclining locked condition, in which a lever 113 of the second locking mechanism 92 faces toward a projecting portion 100a of the reclining lever 100, so that the reclining lever 100 cannot turn clockwise in the drawing around the rivet bolt 106 and the pawl 98 remains engaged with any of the first to third recesses 95 through 97. Therefore, as long as the second lock mechanism 92 is in its locked condition, the reclining mechanism does not assume a reclinable condition even with an external force exerted on the reclining lever 100.

If an attempt is made to turn the reclining lever 100 clockwise in the drawing around the rivet bolt 106 with use of a strong force when the second lock mechanism 92 is in its locking position, a large force acts on the second lock mechanism 92. This force is borne by the lug 103. As a result, it is possible to provide the second lock mechanism 92 on the upper cover (93 in FIG. 9) which is relatively low in rigidity.

FIG. 13(b) shows a reclining unlocked condition. With the lever 113 of the second lock mechanism 92 turned, the reclining lever 100 can be pulled to its imaginary line position and hence the reclining locked condition can be released.

FIG. 14 shows a rear structure of the rider seat according to the present invention. A rear portion of a bottom plate 114 of the rider seat 25 is expanded upward as an expanded portion 115. A vertically long cutout portion 116 is formed in the expanded portion 115 and a support pipe 117 (see FIG. 9) for supporting the combined passenger seat and seat back is positioned in the cutout portion 116.

The support pipe 117 shown in FIG. 14 lies in an upper-limit position thereof and is adapted to move vertically in the range of the cutout portion 116 with reclining motion. Since the cutout portion 116 is open on its lower side, the rider seat 25 can be removed (as shown by the arrows F and G) irrespective of the reclining position. Thus, the operability for removing the seat can be improved.

Figure 15A:
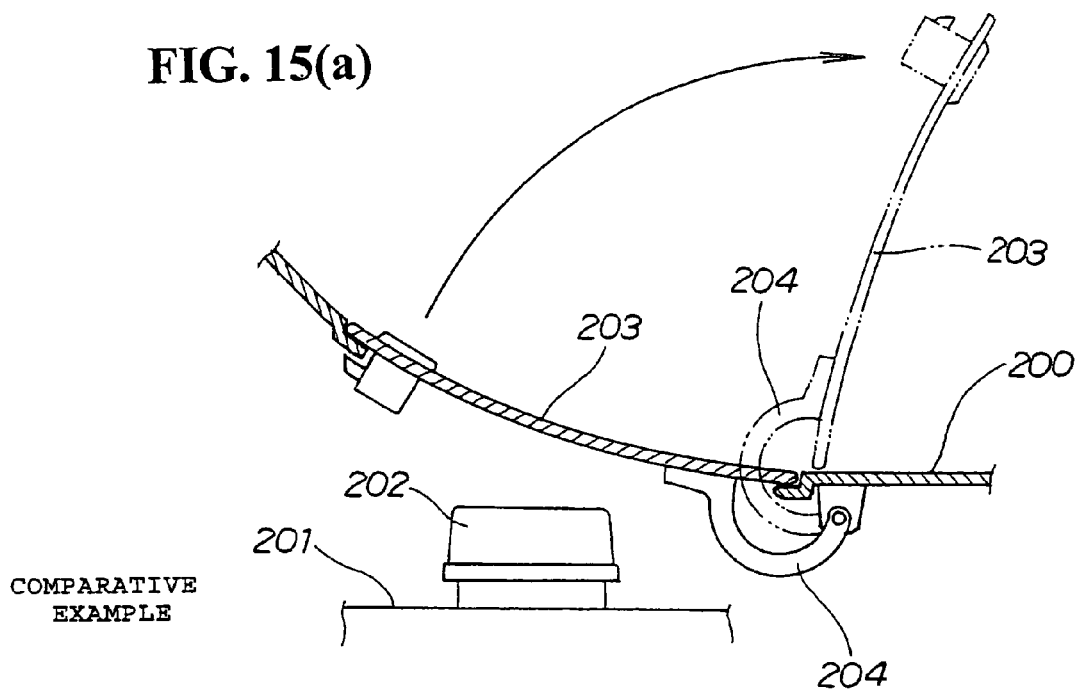
FIGS. 15(a) and 15(b) are diagrams explanatory of a fuel lid provided in the scooter type vehicle.
Figure 15B:
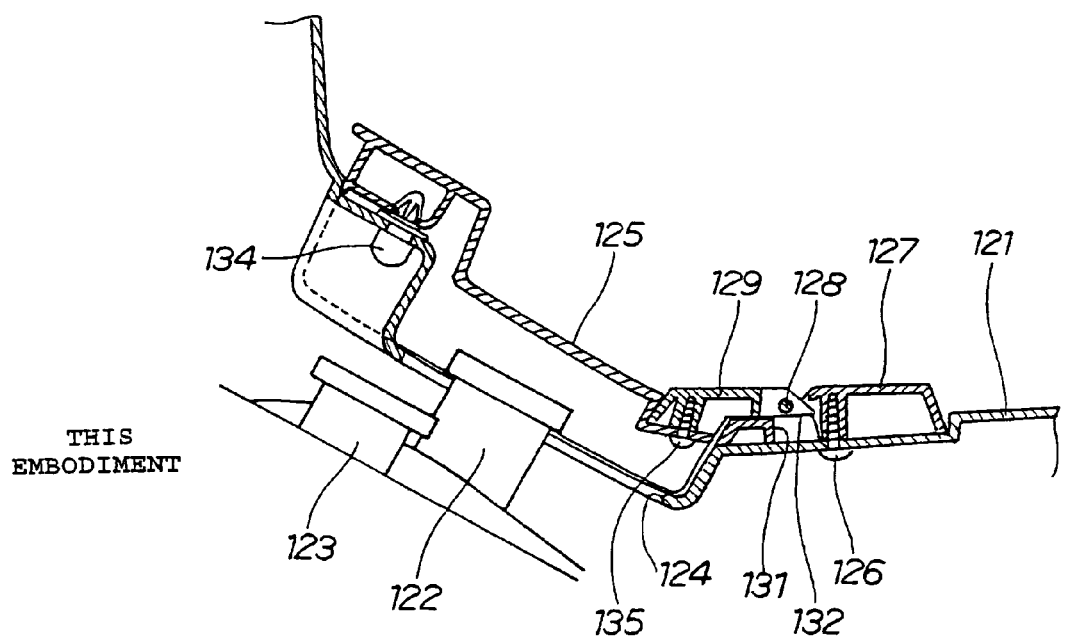

FIGS. 15(a) and 15(b) are explanatory diagrams of a fuel lid provided in the scooter type vehicle, in which FIG. 15(a) shows a comparative example and FIG. 15(b) shows this embodiment. In FIG. 15(a), a fuel tank 201 and a fuel supply port cap 202 are disposed inside a body cover 200. In this case, it is necessary that a fuel lid 203 be attached to the body cover 200. According to the background art, the fuel lid 203 is attached to the body cover 200 so that it can be opened and closed through a U-shaped hinge 204. Previously, it has been necessary to adopt the U-shaped hinge 204 which projects largely downward so as to avoid abutment of the fuel lid 203 against the body cover 200 when opening the fuel lid 203 from its closed state indicated with a solid line up to an open position thereof indicated with an imaginary line.

In this background art structure, a dead space corresponding to the U-shaped hinge 204 is formed inside the body cover 200. If this dead space can be eliminated, the layout of parts mounted on the vehicle becomes easier.

In FIG. 15(b), a fuel tank 122 and a reservoir tank 123 are disposed inside a body cover 121. In this case, a fuel lid 125 which closes an opening 124 formed in the body cover 121 is attached to the body cover 121 by use of a hinge fixed portion 127 which is put on the body cover 121 and fixed with a screw 126 and also by use of a hinge swing portion 129 which is secured to the hinge fixed portion 127 swingably through a pin 128. Since the hinge fixed portion 127 and the hinge swing portion 129 are disposed outside the body cover 121, it is possible to enlarge the space inside the body cover 121.

Figure 16:
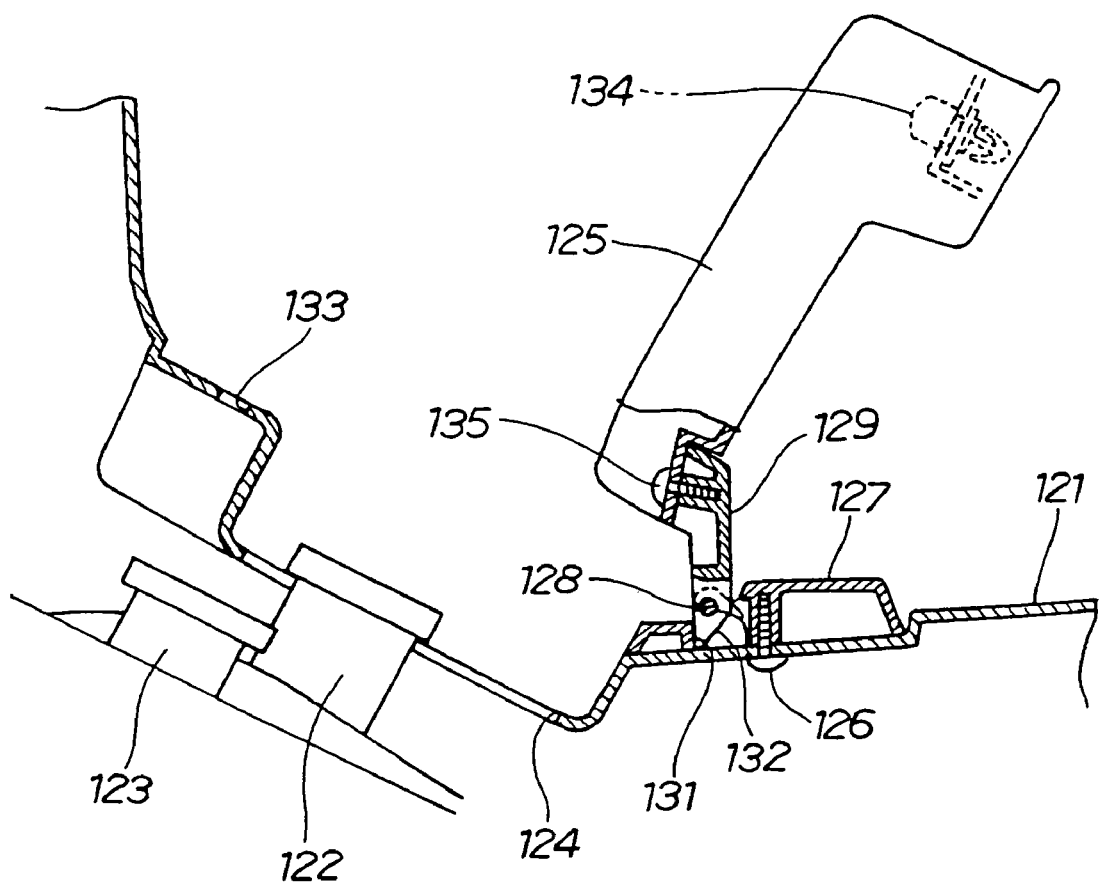
FIG. 16 is a diagram explaining the operation of the fuel lid shown in FIG. 15(b).

FIG. 16 is a diagram for explaining the fuel lid shown in FIG. 15(b). A stopper receiving portion 131 is formed integrally with the hinge fixed portion 127 at a position close to the pin 128, while a stopper 132 is formed integrally with the hinge swing portion 129 at a position close to the pin 128.

When the fuel lid 125 is opened clockwise in the drawing around the pin 128, the stopper 132 comes into abutment against the stopper receiving portion 131, whereupon the fuel lid 125 stops movement. Thus, the force used for opening the fuel lid 125 is difficult to be exerted on the body cover side although it is exerted on the stopper 132 and the stopper receiving portion 131. Next, by turning the fuel lid 125 counterclockwise in the drawing, the fuel lid can be brought into its state shown in FIG. 15(*b*).

The numeral 133 denotes a hole formed in the body cover and numeral 134 denotes a retaining piece provided in the fuel lid 125. By engaging the retaining piece 134 into the hole 133 it is possible to prevent floating and vertical oscillation of the fuel lid 125.

The present invention is not limited to the scooter type vehicle described above. It may be a two- or three-wheeled vehicle exclusive of scooter type vehicles.

The present invention is applicable to scooter type vehicles and to motor cycles having a brake operating piece and a clutch on the right and left sides, respectively, of the vehicle body.

In the present invention, the slide lock mechanism is not limited to the mechanism which locks the operating piece directly. It may be a mechanism which restrains a slider with respect to the vehicle body. The structure and mounting position of the slide lock mechanism are not specially limited insofar as the mechanism adopted can prevent the longitudinal movement of the seat. The means for unlocking the slide lock mechanism is not always the key used for starting the engine, but may be a dedicated key.

The interlocking lock member of the present invention has been described as a laterally long rectangular plate. However, the shape thereof may be changed insofar as the member adopted can simultaneously attain the two functions of seat slide locking and seat removal inhibition.

In the present invention, the lock mechanism is not limited to the mechanism which locks the reclining lever directly. It may be a mechanism which restrains a swing bracket with respect to the vehicle body. The structure and mounting position of the lock mechanism are not specially limited insofar as the mechanism adopted can prevent an angular change of the seat back. The means for operating the lock mechanism is not always the key used for starting the engine, but may be a dedicated key.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A slidable seat structure for a two- or three-wheeled vehicle having a longitudinal axis, comprising:
    a seat having a seat back attached thereto, the seat being attached to a vehicle body of the two- or three-wheeled vehicle through a seat slide mechanism, said seat being movable longitudinally along the longitudinal axis of the vehicle by operation of an operating piece attached to said seat slide mechanism,
    wherein a slide lock mechanism adapted to disable the longitudinal movement of said seat is provided in the vehicle separately from and moveable into engagement with said operating piece to prevent movement of said operating piece when the slide lock mechanism is engaged to the operating piece.

2. A slidable seat structure for a two- or three-wheeled vehicle having a longitudinal axis, comprising:
    a seat attached to a vehicle body of the two- or three-wheeled vehicle through a seat slide mechanism, said seat being movable longitudinally along the longitudinal axis by operation of an operating piece attached to said seat slide mechanism,
    wherein a slide lock mechanism adapted to disable the longitudinal movement of said seat is provided in the vehicle separately from said operating piece, wherein said slide lock mechanism performs locking and unlocking operations with a key which also permits starting of an engine installed in the vehicle.

3. The slidable seat structure according to claim 2, wherein said vehicle body is provided with a seat catcher, said seat is provided with a striker and is constructed so as to be capable of being locked to the vehicle body, and said slide lock mechanism is provided with an interlocking lock member which maintains said seat in its locked state while maintaining said slide lock mechanism in its locked state.

4. The slidable seat structure according to claim 2, wherein said operating piece is disposed on a left side of the longitudinal axis of the vehicle and said key is inserted into and removed from a lock mechanism which is provided in said slide lock mechanism on a right side of the longitudinal axis of the vehicle.

5. The slidable seat structure according to claim 3, wherein said interlocking lock member is constructed so as to be movable, by turning said key, in a transverse direction relative to the longitudinal axis of the vehicle between a position in which the slide lock mechanism disables the operation of said operating piece attached to said seat slide mechanism and the operation of an operating member, which is for removal of said seat, and a position in which both the operation of said operating piece attached to said seat slide mechanism and the operation of the operating member are enabled.

6. A seat structure for a two- or three-wheeled vehicle, comprising:
    a seat back attached through a reclining mechanism to a seat provided in a vehicle body of the two- or three-wheeled vehicle, the reclining mechanism having a base bracket fixed to the vehicle, the base bracket having a plurality of recesses, an angle of the seat back being adjustable by operating a reclining lever to engage any one of said plurality of recesses,
    wherein a lock mechanism for disabling adjustment of the angle of said seat back when the reclining lever is operated is provided separately from and moveable into engagement with said reclining lever to prevent movement of said reclining member when the lock mechanism is engaged to the reclining lever.

7. The seat structure according to claim 6, wherein said lock mechanism performs locking and unlocking operations with a key which also permits starting of an engine installed in the vehicle.

8. The seat structure according to claim 7, wherein said vehicle has a longitudinal axis, and
    wherein said lock mechanism is disposed on a right side of the longitudinal axis of the vehicle so that the key is insertable into and removed from the lock mechanism in transverse direction relative to the longitudinal axis of the vehicle.

9. The seat structure according to claim 8, wherein said reclining mechanism comprises:
    a swing bracket fixed to said seat back;
    a reclining lever having a pawl configured to pop in and out of one of said recesses on a same plane as said base bracket;

a connecting plate which sandwiches said base bracket and said reclining lever in between said connecting plate and said swing bracket and which supports said reclining lever pivotably through a shaft while being supported together with said swing bracket pivotably through a shaft relative to said base bracket; and a spring connected between said reclining lever and said connecting plate so as to restrict pivotal motion of the reclining lever resiliently, said reclining lever being provided with an integral projecting portion, wherein said lock mechanism is supported by said swing bracket and has a lever interlocked with rotation of the key which is inserted into the lock mechanism, and said lever is movable by engagement with said projecting portion to positions permitting and inhibiting the pivotal motion of said reclining lever.

10. A seat structure for a two- or three-wheeled vehicle having a longitudinal axis, comprising:

a seat attached to a vehicle body of the two- or three-wheeled vehicle through a seat slide mechanism, said seat being movable longitudinally along said longitudinal axis by operation of an operating piece attached to said seat slide mechanism; and a seat back attached through a reclining mechanism to said seat, an angle of the seat back being adjustable by operating a reclining lever, wherein a slide lock mechanism adapted to disable the longitudinal movement of said seat is provided in the vehicle separately from and moveable into engagement with said operating piece to prevent movement of said operating piece when the slide lock mechanism is engaged to said operating piece, and a reclining lock mechanism for disabling adjustment of the angle of said seat back is provided separately from and moveable into engagement with said reclining lever to prevent movement of said reclining lever to prevent movement of said reclining lever when the reclining lock mechanism is engaged to the reclining lever.

11. The seat structure according to claim 10, wherein said slide lock mechanism performs locking and unlocking operations with a key which also permits starting of an engine installed in the vehicle.

12. The seat structure according to claim 11, wherein said vehicle body is provided with a seat catcher, said seat is provided with a striker and is constructed so as to be capable of being locked to the vehicle body, and said slide lock mechanism is provided with an interlocking lock member which maintains said seat in its locked state while maintaining said slide lock mechanism in its locked state.

13. The seat structure according to claim 11, wherein said operating piece is disposed on a left side of the longitudinal axis of the vehicle and said key is inserted into and removed from a lock mechanism which is provided in said slide lock mechanism on a right side of the longitudinal axis of the vehicle.

14. The seat structure according to claim 12, wherein said interlocking lock member is constructed so as to be movable, by turning said key, in a transverse direction of with respect to a longitudinal axis of the vehicle between a position in which the slide lock mechanism disables the operation of said operating piece attached to said seat slide mechanism and the operation of an operating member, which is for removal of said seat, and a position in which both the operation of said operating piece attached to said seat slide mechanism and the operation of the operating member are enabled.

15. The seat structure according to claim 10, wherein said reclining lock mechanism performs locking and unlocking operations with a key which also permits starting of an engine installed in the vehicle.

16. The seat structure according to claim 15, wherein said reclining lock mechanism is disposed on a right side of the longitudinal axis of the vehicle so that the key is insertable into and removed from the reclining lock mechanism in a transverse direction with respect to the longitudinal axis of the vehicle.

17. The seat structure according to claim 16, wherein said reclining mechanism comprises:

a base bracket fixed to the vehicle body and having a plurality of recesses;

a swing bracket fixed to said seat back;

a reclining lever having a pawl configured to pop in and out of one of said recesses on a same plane as said base bracket;

a connecting plate which sandwiches said base bracket and said reclining lever in between said connecting plate and said swing bracket and which supports said reclining lever pivotably through a shaft while being supported together with said swing bracket pivotably through a shaft relative to said base bracket; and a spring connected between said reclining lever and said connecting plate so as to restrict pivotal motion of the reclining lever resiliently, said reclining lever being provided with an integral projection portion, wherein said reclining lock mechanism is supported by said swing bracket and has a lever interlocked with rotation of the key which is inserted into the reclining lock mechanism, and said lever is movable by engagement with said projecting portion to positions permitting and inhibiting the pivotal motion of said reclining lever.

* * * * *